(No Model.)

D. F. OLIVER.
VEHICLE SEAT.

No. 439,325. Patented Oct. 28, 1890.

Witnesses:
J. H. Arase
H. C. Lee.

Inventor
Doctor F. Oliver
By Dewey & Co.
Attys

UNITED STATES PATENT OFFICE.

DOCTOR F. OLIVER, OF OAKLAND, ASSIGNOR TO TRUMAN HOOKER & CO., OF SAN FRANCISCO, CALIFORNIA.

VEHICLE-SEAT.

SPECIFICATION forming part of Letters Patent No. 439,325, dated October 28, 1890.

Application filed August 20, 1890. Serial No. 362,544. (No model.)

*To all whom it may concern:*

Be it known that I, DOCTOR F. OLIVER, a citizen of the United States, residing at Oakland, Alameda county, State of California, have invented an Improvement in Vehicle-Seats; and I hereby declare the following to be a full, clear, and exact description of the same.

My invention relates to that class of vehicle-seats in which the seat is pivoted at one end and is adapted to be turned in a horizontal plane from a position for use to a position out of the way to enable a person to readily enter the vehicle.

My invention consists in the novel constructions and arrangements hereinafter fully described, and specifically pointed out in the claims.

The object of my invention is to provide a simple turning seat of this class.

Figure 1:
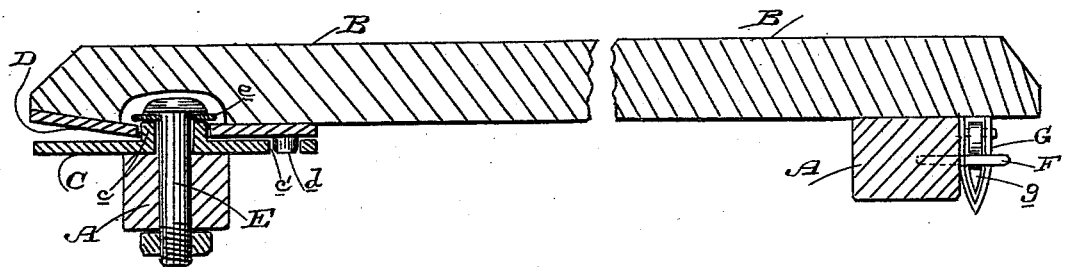
Figure 2:
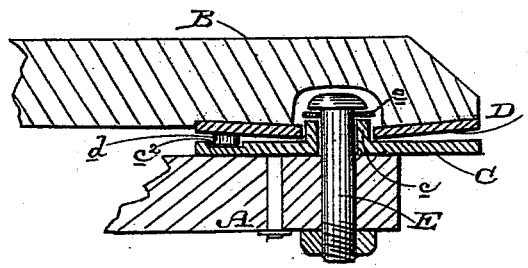
Figure 3:
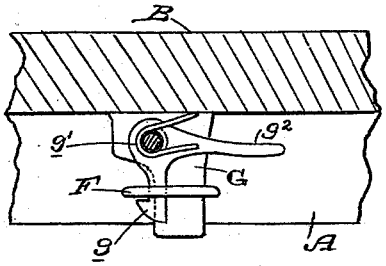

Referring to the accompanying drawings for a more complete explanation of my invention, Figure 1 is a section showing the seat in a closed position. Fig. 2 is a section showing the seat turned to an open position. Fig. 3 is an elevation of the latch.

A represents the seat-supports on each side. B is the seat.

Upon one of the seat-supports is a wearing-plate C, and under that end of the seat B is a wearing-plate D, said plate D having one-half of it bent upwardly, as shown. The plate D is mounted upon the plate C by means of a central hub $c$ on the last-named plate, and the seat is pivoted by means of a bolt E, which passes through the support A and through the plate C and is headed in a suitable recess in the seat B, a washer $e$ intervening. In the plate C is an aperture or hole $c'$, into which a stud or projection $d$ on the plate D is adapted to fit, and said plate C is also provided with a socket $c^2$, into which said stud or projection $d$ fits when the seat is turned to an open position. Upon the other support A is secured a catch-staple F, and to that end of the seat is secured a downwardly-extending hanger G, in which is pivoted a latch $g$, which is controlled by a spring $g'$ and is operated by a lever or handle $g^2$.

The operation of the seat is as follows: When in a normal position transverse of the vehicle, the latch $g$ engages the staple F, holding the seat on that side. On the other side the projection or stud $d$ fits into the hole $c'$ and secures the seat on that side. Now, to turn the seat to provide a free passage-way to enter the vehicle the operator lifts up on the handle $g^2$, which has the effect of releasing the latch $g$ from the staple F, and further movement of the handle against the bottom of the seat bodily lifts that end of the seat, whereby the other end, rocking on the bent plate D, removes the stud or projection $d$ from the hole $c'$. Then the seat is turned backwardly in a horizontal plane, the stud or projection $d$ then traveling directly on the wearing-plate C and serving as a bearing or track for the seat as it turns to its open position. When it reaches a position at right angles to its normal one, the stud or projection $d$ drops into the socket $c^2$ of the wearing-plate C, whereby the seat is held in this open position. To return the seat, it is lifted slightly, rocking on the plate D, so as to remove the stud or projection from the socket $c^2$, and said projection then traveling on the plate D carries the seat steadily and keeps it from sagging, so that when the latch $g$ reaches the other support A it is high enough to pass freely over said support until the stud or projection drops into the hole $c'$, whereupon the latch $g$ drops down to and engages the staple F automatically under the influence of its spring $g'$.

Having thus described my invention, what I claim as new, and desire to secure by Letters Patent, is—

1. The combination of the pivoted seat, the fixed wearing-plate C, having the opening or hole $c'$, and the bent wearing-plate D, secured to the seat, and having the stud or projection $d$, substantially as herein described.

2. The combination of the pivoted seat, the fixed wearing-plate C, having the hole or aperture $c'$ and the socket $c^2$, and the bent wearing-plate D, secured to the seat and having the stud or projection $d$, adapted to fit in hole $c'$ when the seat is closed and in socket $c^2$ when the seat is open, substantially as herein described.

3. The combination of the seat, the support A, the wearing-plate secured to said support and having the aperture or hole and the socket, the bent wearing-plate secured to the seat and having the stud or projection, and the pivot-bolt on which the seat turns, substantially as herein described.

4. The combination of the seat-supports, the seat pivoted at one end to one of said supports, a latch at the other end for securing it to the other support, and the bent wearing-plate secured to the seat, whereby said seat may rock to cause its latch to clear the support in turning, substantially as herein described.

5. The combination of the seat-supports, the seat pivoted at one end to one of said supports, and a latch at the other end for securing it to the other support, the wearing-plate C of the first support having a hole $c'$, and the bent wearing-plate D of the seat having the stud or projection on which the seat rides and adapted to fit the hole $c'$, substantially as herein described.

6. The combination of the seat-supports, the seat pivoted at one end to one of said supports, the catch-staple on the other support, and spring controlled and handled latch on that end of the seat, the wearing-plate of the first support having the hole $c'$ and socket $c^2$, and the bent wearing-plate of the seat having the stud or projection $d$, substantially as herein described.

In witness whereof I have hereunto set my hand.

DOCTOR F. OLIVER.

Witnesses:
S. H. NOURSE,
LINCOLN SONTAG.